United States Patent [19]

Foladare et al.

[11] Patent Number: 5,724,416
[45] Date of Patent: Mar. 3, 1998

[54] NORMALIZATION OF CALLING PARTY SOUND LEVELS ON A CONFERENCE BRIDGE

[75] Inventors: Mark Jeffrey Foladare, Kendall Park; Shelley B. Goldman, East Brunswick; David Phillip Silverman, Somerville, all of N.J.

[73] Assignee: AT&T Corp

[21] Appl. No.: 672,767

[22] Filed: Jun. 28, 1996

[51] Int. Cl.⁶ .................... H04M 3/42; H04Q 11/04
[52] U.S. Cl. .................. 379/202; 370/260; 370/263; 370/268; 370/269; 379/204
[58] Field of Search ................... 379/202, 203, 379/204, 205, 206; 370/260, 261, 262, 263, 264, 265, 266, 267, 268, 269

[56] References Cited

U.S. PATENT DOCUMENTS

| | | | |
|---|---|---|---|
| 4,455,455 | 6/1984 | Little | 379/203 |
| 4,467,143 | 8/1984 | Warman | 379/202 |
| 4,475,189 | 10/1984 | Herr et al. | 370/261 |
| 4,481,383 | 11/1984 | Madon | 379/204 X |
| 4,611,320 | 9/1986 | Southard | 370/241 |
| 4,644,530 | 2/1987 | Phiet | 370/261 |
| 4,648,108 | 3/1987 | Ellis et al. | 379/202 |
| 4,878,242 | 10/1989 | Springer et al. | 379/204 |
| 5,034,947 | 7/1991 | Epps | 370/268 |
| 5,414,750 | 5/1995 | Bhagat et al. | 379/57 |
| 5,436,896 | 7/1995 | Anderson et al. | 370/260 |
| 5,483,587 | 1/1996 | Hogan et al. | 379/202 |
| 5,491,695 | 2/1996 | Meagher et al. | 370/260 |
| 5,495,522 | 2/1996 | Allen et al. | 379/202 |
| 5,502,762 | 3/1996 | Andrew et al. | 379/202 |

*Primary Examiner*—Harry S. Hong
*Attorney, Agent, or Firm*—S. M. Gurey

[57] ABSTRACT

A conference call sound level balancing method and system for selectively muting a conferee whose sound environment is loud enough to dominate other conferees of a conference call. The method is operable on a system that includes a network-based conference bridge and a sound equalization platform that is coupled to each telephone of a conference call. If one telephone connected to the conference call has a higher noise level than the other branches of the call, thus making it so the other branches cannot obtain speaking privileges, a predetermined touchtone key is entered at the noisy telephone. The sound equalization platform responds by automatically measuring the ambient sound levels of the respective branches of the conference call and balancing the speaking privileges for the respective call branches of the conference call.

20 Claims, 2 Drawing Sheets

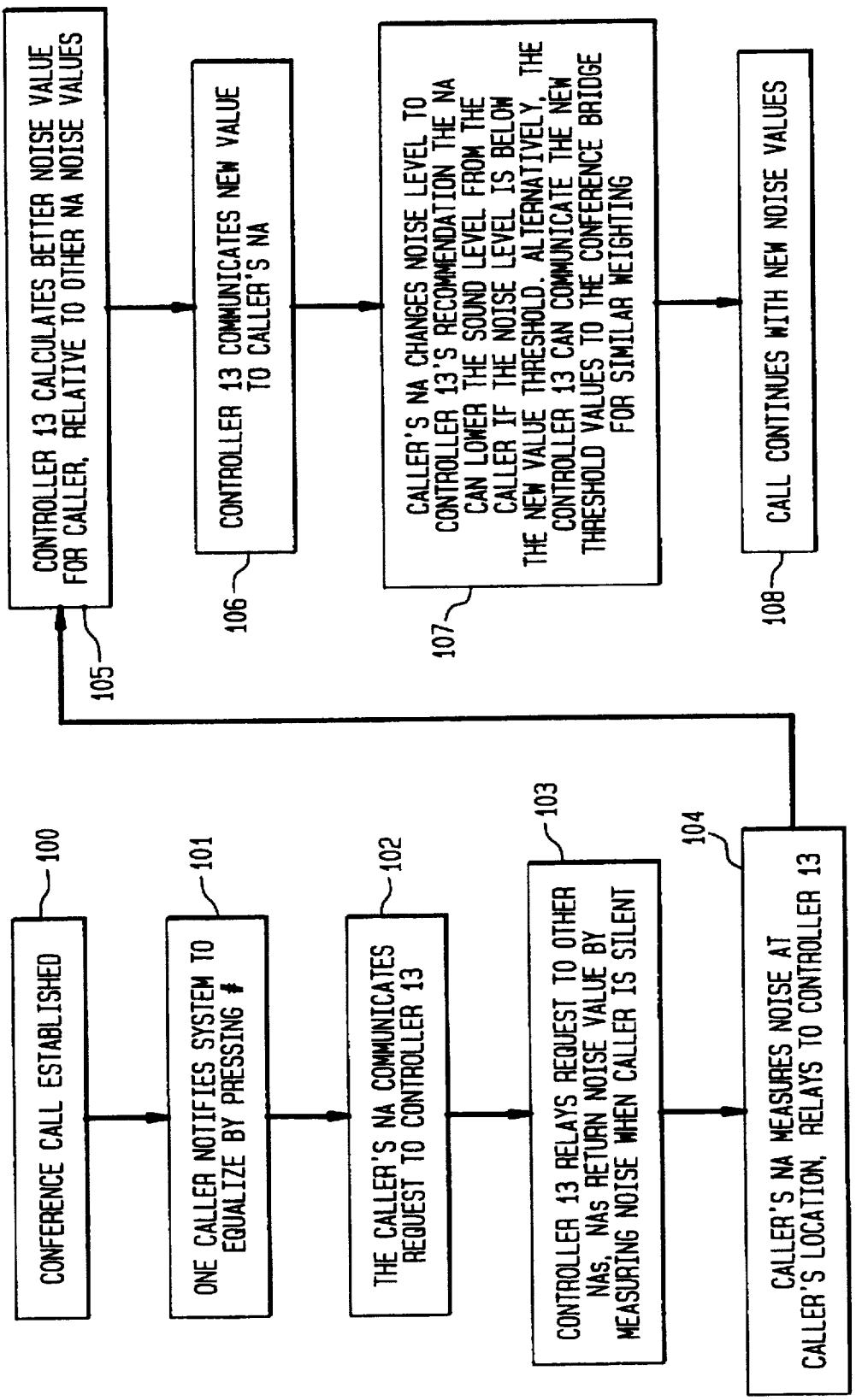

# 5,724,416

NORMALIZATION OF CALLING PARTY SOUND LEVELS ON A CONFERENCE BRIDGE

BACKGROUND OF THE INVENTION

1. Field of the Invention

The present invention relates to the field of telecommunications. More particularly, the present invention relates to network-based conference bridging systems.

2. Description of the Related Art

Network-based conference bridging platforms are well-known for allowing subscribers of a conferencing service to dial a particular number and be connected to a conference call, that is, a telephone call having more than two parties, or conferees, with each conferee being remotely located from each other. For example, a network-based conference bridging service offered by a long distance telecommunications carrier allows a plurality of parties to dial a number, such as an "800" number, for example, and be connected to a conference call. Each party to such a network-based conference call can be located in different geographical regions that are served by difference local exchange carriers (LEC).

For voice quality purposes, parties to a conference call are granted speaking privileges, or speaking rights, by conventional network-based conference bridging systems. This is done, for example, by a conference bridging system comparing the speech, or sound levels of each conferee with the sound levels of other conferees and selecting the speech of the conferee having the loudest sound level to be transmitted to the other parties, while the speech of the other parties is muted.

This approach has the drawback of conferees having loud or noisy connections frequently dominating other conferees to the point where the latter are not heard by the louder conferees. For example, a conferee who is connected to a conventional network-based bridging system through a mobile or cellular telephone might have an ambient and system noise level when the conferee is silent that exceeds the voice level of the other conferees. Another common situation is when a conferee is using a public telephone in a noisy environment, such as at an airport terminal or train station. For all conferees to be heard, the conferees that are dominated by the louder connections must yell or the other parties will hear only the noise emanating from the dominating connection.

SUMMARY OF THE INVENTION

The present invention overcomes the problem of louder conferees dominating a conference call by automatically adapting a conference bridge system to the louder sound environment of the dominating conferee. In that regard, the present invention provides selective muting of the louder conferee when that conferee is not speaking, although the conferee's sound environment would otherwise be loud enough to dominate other parties if the conference call is placed through a conventional network-based conference bridging system.

BRIEF DESCRIPTION OF THE DRAWING

The present invention is illustrated by way of example and not limitation in the accompanying figures in which like reference numerals indicate similar elements and in which:

FIG. 2 is a diagram showing the operational flow of a network-based conference bridging system according to the present invention.

DETAILED DESCRIPTION

Figure 1:
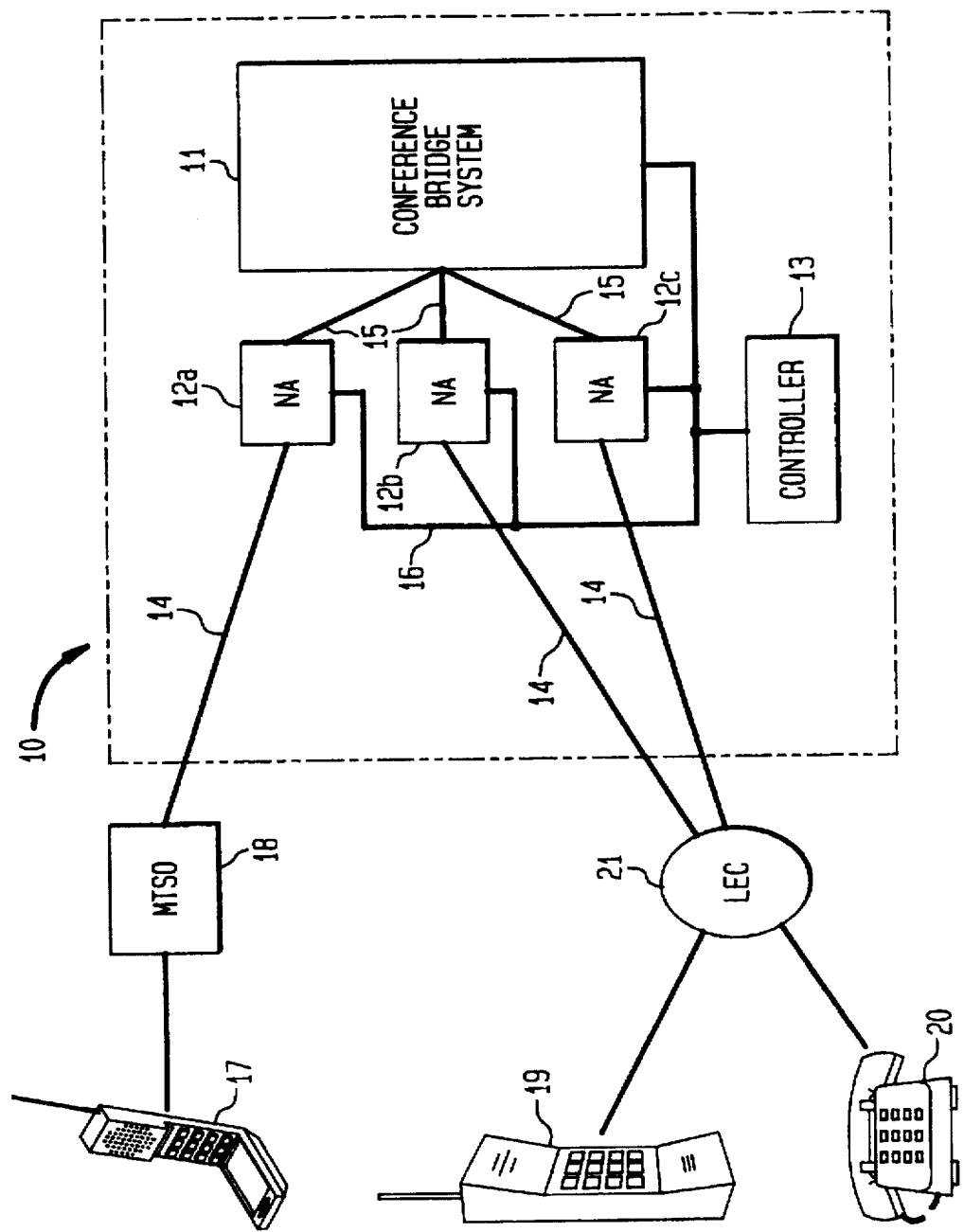
FIG. 1 shows a system block diagram of a network-based conference bridging system according to the present invention.

FIG. 1 shows a system block diagram of a network-based conference bridging platform 10 according to the present invention. Platform 10 includes a conventional conference bridging system 11, a plurality of noise adapters (NA) 12, and a controller 13. Lines 14 represent telephone connections within a telecommunications network, such as a long-distance telecommunications network, that are made to noise adapters 12. Noise adapters 12 are connected to conference bridging system 11 by lines 15, completing subscriber calls accessing platform 10. Conference bridging system 11, noise adapters 12 and controller 13 are also connected in a well-known manner through signalling network 16, such as an SS7 network, for example. The components forming platform 10 can all be physically located at one location or can be distributed around the telecommunications network in a well-known manner.

Subscribers access conference bridge platform 10 in a well-known manner by dialing a designated number. For the exemplary long-distance telecommunication network of FIG. 1, an "800" number, for example, is dialed providing access to the conference call service over a wide geographic area. This allows a user of a mobile or cellular telephone 17 located in Oregon, for example, access to platform 10 through a mobile telephone switching office (MTSO) 18 and network lines 14. Similarly, a user of a cordless telephone 19 on a factory floor in a factory located in South Carolina, for example, and a user of a land line telephone 20 in the main corporate office for the factory located in North Carolina, for example, each gain access to platform 10 through local exchange carrier (LEC) 21 and network lines 14.

FIG. 2 shows a flow diagram showing of the preferred operation network-based conference bridging platform 10. At step 100, subscribers desiring a conference call each dial a designated telephone number to access the conference call service. The platform requests specific information from the respective subscribers in a well-known manner, such as a personal identification number (PIN) and other information for establishing the conference call.

For this example, the user of cordless telephone 19 in FIG. 1 is in a high noise environment on a factory floor. To avoid dominating the conference call, the subscriber at telephone 19 enters a predetermined touchtone or DTMF key, for example, the "#" key, at step 101, selectively requesting that the noise level of this branch of the conference call be automatically normalized, or balanced, with the noise levels of the other branches of the call. Of course, another predetermined signal, such as entry of a flash hook can be entered for automatically balancing the speaking privileges of the conference call. Noise adapter 12b, which is connected to telephone 19, detects the entry of the # key in a well-known manner. The request for normalization is signaled to controller 13 in a well-known manner over signalling network 16 at step 102.

At step 103, controller 13 relays the normalization request to conference bridging system 11 and the other noise adapters, noise adapters 12a and 12c, over signalling network 16. Conference bridging system 11 generates speech signals in a well-known manner prompting each conferee that the conference call is being automatically balanced and, consequently, to be silent. When the other conferees are silent, each respective noise adapter 12 preferably measures the decibel level of the ambient noise, or sound, on each corresponding branch of the conference call in a well-known manner. The sound level measurement values are then sent to controller 12 over network 16. Preferably, at step 104, the conferee is prompted to be silent and noise adapter 12b similarly measures the decibel level of the sound on the line connected to telephone 19 when the subscriber is silent in a well-known manner. The sound level measurement value is then sent to controller 13 over network 16.

At step 105, controller 13 compares the respective sound level measurements for the conference call and determines a better noise level for the subscriber at telephone 19 relative to the noise levels for the subscribers at telephones 17 and 20 so that the speaking privileges, or speaking rights, of the respective subscribers are balanced. As an alternative, the subscriber on the noisy line can be prompted at step 104 to additionally speak a predetermined phrase in a normal tone of voice while a second sound level measurement is made. Controller 13 then uses the two sound level measurements for determining a better sound level for the subscriber at telephone 19.

At step 106, controller communicates a new noise value to noise adapter 12b. At step 107, noise adapter 12b changes the noise level of the branch connected to telephone 19, for example, by attenuating the sound level, based on the recommendation provided by controller 13. Alternatively, controller 13 can determine that an increased speaking privilege threshold for the subscriber at telephone 19 is needed for balancing speaking privileges and communicates the magnitude of the increase to conference bridge system 11. Conference bridge system 11 then weights the respective speaking privileges in a well-known manner, providing a conference call with balanced speaking privileges.

At step 108, the conference call is rebridged and the three conferees proceed with their conference call. Should the subscriber using mobile telephone 17 now be in a noisy environment relative to the other conferees, the subscriber enters a touchtone "#" for selectively balancing the speaking privileges and platform 10 automatically responds as described.

In another embodiment of the invention, controller 13 relays the normalization request to conference bridging system 11 and to noise adapters 12a and 12b. Noise adapters 12a, 12b and 12c then each continuously sample the sound level of the respective branches of the conference call and the lowest measured sound decibel level for each branch is sent to controller 13 over network 16. This alternative approach does not require the system to prompt each conferee to be silent for a sound level measurement because the system considers the lowest measured sound level to be when a conferee is silent. Controller 13 compares the respective lowest sound level measurements for the conference call and determines a better noise level for the subscriber at telephone 19 relative to the noise levels for the subscribers at telephones 17 and 20 so that the speaking privileges of the respective subscribers are balanced. After the speaking privileges have been balanced, noise adapters 12 can also continuously sample the respective sound levels for measuring the lowest sound decibel level of the respective branches of the conference call so that the speaking privileges of the conferees can be balanced on a continuous basis during the conference call.

In another embodiment of the present invention, platform 10 provides a manual speaking privilege balancing feature for complementing the automatic speaking privilege balancing feature already described. In this embodiment, platform 10 responds to entry of a touchtone "#" or other similar signal by muting the conference call branch in which the "#" was entered. In yet another embodiment, platform 10 responds to entry of a "#" by muting the other conferees on the call. In still another embodiment, platform 10 responds to entry of a "#" by progressively reducing the signal level at the appropriate noise adapter, or progressively scaling the speaking privilege threshold accordingly at the conference bridging system, by a predetermined amount. For this embodiment, the other conferees on the call would then provide feedback to the noisy subscriber about the quality of the conference call, that is, the relative speaking privileges. The noisy subscriber would continue to enter "#" until all conferees could participate in a balanced way.

While the present invention has been described in connection with the illustrated embodiments, it will be appreciated and understood that modifications may be made without departing from the true spirit and scope of the invention.

We claim:

1. A method of balancing sound levels of a conference call formed on a network-based conference bridge, the conference call being formed from a plurality of telephone calls, the method comprising the steps of:

receiving a predetermined signal in one telephone call of the conference call;

measuring a sound level of the one telephone call; and adjusting the sound level of the one telephone call relative to respective sound levels of other telephone calls of the conference call.

2. The method according to claim 1, further comprising the steps of:

measuring a sound level of each of the telephone calls forming the conference call; and adjusting the sound level of the one telephone call relative to respective sound levels of other telephone calls of the conference call.

3. The method according to claim 2, further comprising the steps of:

measuring an ambient sound level of the one telephone call when a caller is silent;

measuring a speaking sound level when the caller is speaking; and setting a permission-to-speak threshold for the one telephone call based on the ambient and speaking sound levels.

4. The method according to claim 3, wherein the predetermined signal is a DTMF signal.

5. The method according to claim 2, wherein the step of measuring the sound level of each of the telephone calls forming the conference call includes the steps of:

sampling the sound level of each of the telephone calls forming the conference call; and determining a minimum sound level for each of the telephone calls.

6. The method according to claim 5, wherein the step of adjusting the sound level of the one telephone call relative to respective sound levels of other telephone calls of the conference call is based on the minimum sound level for each respective telephone call.

7. The method according to claim 6, wherein the step of sampling the sound level of each of the telephone calls forming the conference call is done continuously during the conference call.

8. The method according to claim 1, further comprising the steps of:

measuring an ambient sound level of the one telephone call when a caller is silent;

measuring a speaking sound level when the caller is speaking; and setting a permission-to-speak threshold for the one telephone call based on the ambient and speaking sound levels.

9. The method according to claim 8, wherein the predetermined signal is a DTMF signal.

10. A conference call balancing system comprising:

a network-based conference bridge connecting a plurality of telephone calls together forming a conference call; and a sound equalization platform coupled to each telephone call of the conference call, the sound equalization platform being responsive to a predetermined signal contained within one of the telephone calls forming the conference call by adjusting the sound level of the one telephone call relative to respective sound levels of other telephone calls of the conference call.

11. The conference call balancing system according to claim 10, wherein the sound equalization platform adjusts the sound level of the one telephone call by measuring a sound level of the one telephone call and adjusting the sound level of the one telephone call relative to respective sound levels of other telephone calls of the conference call.

12. The conference call balancing system according to claim 11, wherein the sound equalization platform adjusts the sound level of the one telephone call by measuring an ambient sound level of the one telephone call when a caller is silent and a speaking sound level when the caller is speaking, and by setting a permission-to-speak threshold for the one telephone call based on the ambient and speaking sound levels.

13. The conference call balancing system according to claim 10, wherein the sound equalization platform adjusts the sound level of the one telephone call by measuring a sound level of each of the telephone calls forming the conference call and adjusting the sound level of the one telephone call relative to respective sound levels of other telephone calls of the conference call.

14. The conference call balancing system according to claim 13, wherein the sound equalization platform adjusts the sound level of the one telephone call by sampling the sound level of each of the telephone calls forming the conference call and adjusting the sound level of the one telephone call relative to respective sound levels of the other telephone based on sampled minimum sound levels of the respective telephone calls.

15. The conference call balancing system according to claim 10, wherein the sound equalization platform adjusts the sound level of the one telephone call relative to other telephone calls of the conference call by muting the sound level of the other telephone calls.

16. The conference call balancing system according to claim 10, wherein the sound equalization platform includes, a plurality of noise adapters, each noise adapter being coupled to each respective telephone call forming the conference call; and a controller coupled to each of the noise adapters, and wherein the predetermined signal is a DTMF signal.

17. A network-based conference call system comprising:

a telecommunications network containing a plurality of calls;

a network-based conference bridge connected to the telecommunications network, the conference bridge connecting a selected number of telephone calls together to form a conference call;

a plurality of noise adapters, each noise adapter coupled to each respective telephone call of the conference call; and a controller coupled to each of the noise adapters, the controller responsive to a predetermined signal contained within one of the telephone calls forming the conference call by adjusting the sound level of the one telephone call relative to respective sound levels of other telephone calls of the conference call.

18. The network-based conference call system according to claim 17, wherein the controller adjusts the sound level of the one telephone call by controlling the noise adapter coupled to the one telephone call to measure a sound level of the one telephone call and to adjust the sound level of the one telephone call relative to respective sound levels of other telephone calls of the conference call.

19. The network-based conference call system according to claim 17, wherein the controller adjusts the sound level of the one telephone call by controlling each noise adapter to measure a sound level of the respective telephone calls forming the conference call and by controlling the noise adapter coupled to the one telephone call to adjust the sound level of the one telephone call relative to respective sound levels of other telephone calls of the conference call.

20. The network-based conference call system according to claim 17, wherein the controller adjusts the sound level of the one telephone call by controlling each noise adapter to sampling the sound level of each of the telephone calls forming the conference call and by controlling the noise adapter coupled to the one telephone call to adjust the sound level of the one telephone call relative to respective sound levels of the other telephone based on sampled minimum sound levels of the respective telephone calls.

\* \* \* \* \*